March 25, 1947. B. H. BROWALL 2,417,859
LOAD GEAR EQUIPMENT FOR VEHICLE BRAKES
Filed Oct. 1, 1945
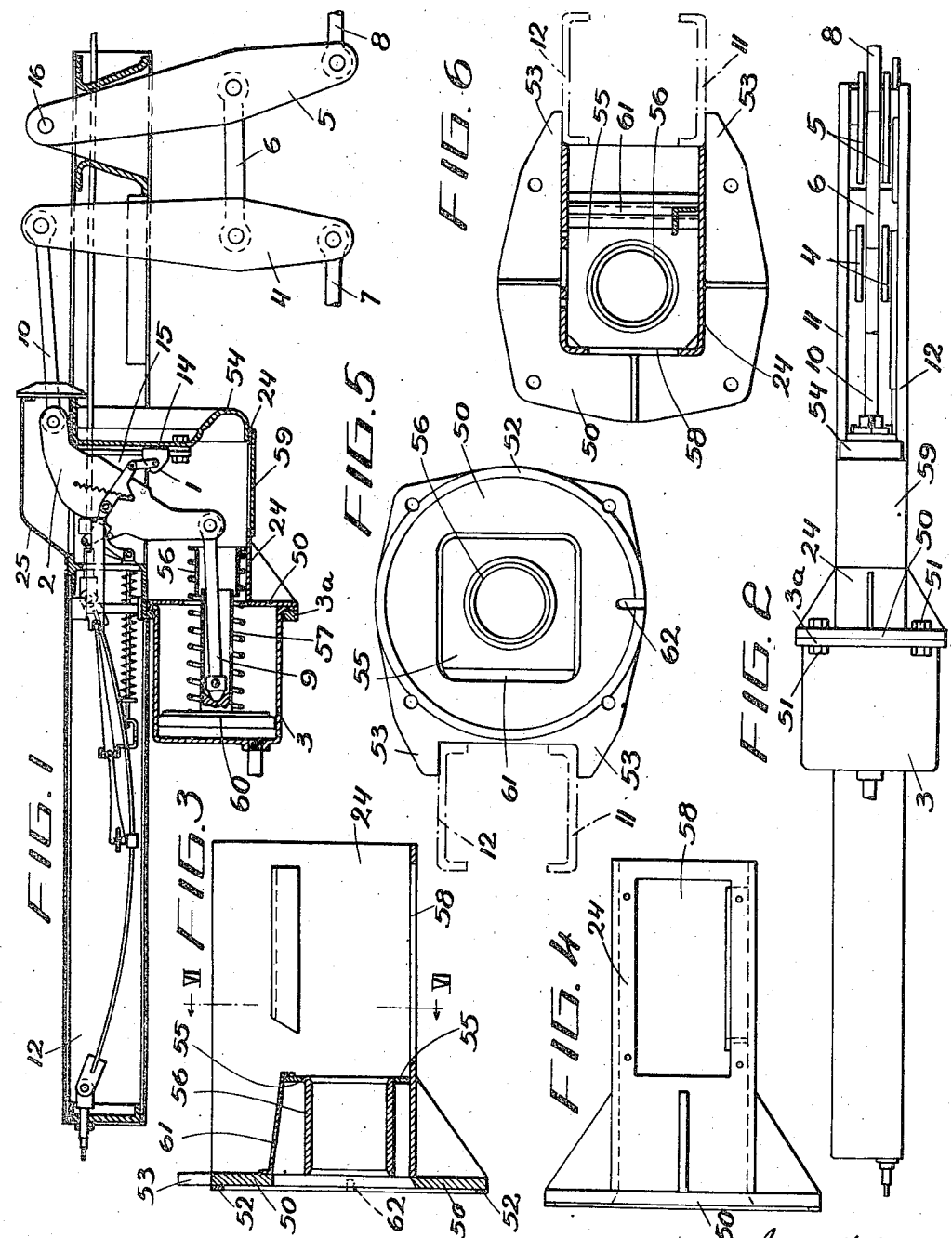

UNITED STATES PATENT OFFICE 2,417,859

LOAD GEAR EQUIPMENT FOR VEHICLE BRAKES

Bert Henry Browall, Malmo, Sweden, assignor to Svenska Aktiebolaget Bromsregulator, Malmo, Sweden, a corporation of Sweden Application October 1, 1945, Serial No. 619,649
In Sweden October 24, 1944

5 Claims. (Cl. 188—195)

This invention relates to such brakes for vehicles, especially railway vehicles, as are provided in their rigging with a so called load gear for varying the brake applying leverage according to the varying load of the vehicle. More particularly the invention relates to a load gear equipment of the character disclosed and claimed in my copending U. S. Patent application Ser. No. 539,899, filed June 12, 1944 (Pat. No. 2,394,038, granted February 5, 1946).

The invention has for its chief object to simplify the construction of the load gear equipment, and to reduce or facilitate the disassembly and reassembly thereof required on inspection and renovation of its parts, especially the brake cylinder.

Further objects and advantages of the invention will be apparent from the following description of a preferred embodiment which for illustrative purposes is shown in the accompanying drawings, in which:

Figs. 1 and 2 are a longitudinal horizontal section and a side view, respectively, of the load gear equipment. Fig. 3 a longitudinal horizontal detail section, Figs. 4 and 5 corresponding detail side and end views, respectively, and Fig. 6 a section on the line VI—VI in Fig. 3.

In the following description having reference to the drawings, as far as possible the same reference numerals will be used for the various parts as for corresponding parts shown in the drawings of my copending U. S. application Ser. No. 539,899 in order to facilitate a comparison therewith.

In the drawings, 1 is the shiftable fulcrum, 2 the reversing lever operatively associated therewith, 3 the brake cylinder, 4 and 5 the two equalizing levers, 6 the coupling rod therebetween, 7 and 8 the brake pull rods extending from the equalizing levers 4 and 5 towards the two ends of the vehicle, 9 the push rod acting on one end of the reversing lever, 10 the rod connecting the other end of the reversing lever to the cylinder lever 4. and 11 and 12 the upper and lower longitudinal parts of the beam carrying the load gear proper formed by the reversing lever 2 and the shiftable fulcrum 1. The beam is extended from the said load gear proper towards each of the two ends of the vehicle. The brake cylinder 3 is disposed on one side of the beam at the extension thereof towards one end of the vehicle, and the stationary fulcrum 16 for the floating lever 5 is mounted on the other side of the beam at the extension thereof towards the other end of the vehicle. Further there are the transverse partition 14 inserted between the upper and lower longitudinal beam parts 11 and 12 and provided with the guide for the shiftable fulcrum 1, the transverse space 15 in the beam for the reversing lever 2, and the case 25 closing this space on the side of the beam opposite to that on which the brake cylinder 3 is disposed.

According to the invention, the case 24 closing the space 15 on the side of the beam on which the brake cylinder 3 is disposed, is rigidly attached to the beam and constructed so as to form a support for the brake cylinder 3. For this purpose, in the embodiment shown, the case 24 has an end wall facing the brake cylinder 3 and comprising a plate 50 shaped as the flange of a cylinder head, to which the cylinder 3, preferably pressed of sheet metal into the form of a cup, is clamped at its open end by means of bolts 51. The plate 50, which at the side facing the cylinder 3 is provided with a centering ring 52, rim, or the like, for facilitating the centering of the cylinder, has a couple of projections 53, with which it straddles the beam 11, 12 and is welded or otherwise rigidly secured to the beam in a position at right angles thereto. The plate 50 is preferably of sheet metal and welded to the other part of the case 24, which preferably also is made of sheet metal and which at its end opposite the plate 50 is closed by, and welded or otherwise rigidly secured to, a suitably constructed extension 54 of the partition 14. Welded or otherwise secured to the inside of the case 24 is a plate 55 supporting a tubular piece 56 serving as a guide for the ordinary brake piston barrel 57, which projects into the case 24 through the cylinder head plate 50. The case 24 has a side opening 58 for inspection, closed by means of a detachable lid 59.

In order to prevent dirt and humidity from being sucked into the space 15 at the movements of the brake piston 60, a plate 61 may be provided between plates 55 and 50 to prevent communication between the space 15 and the cylinder 3, in which case a venting channel 62 is preferably provided in the cylinder head plate 50, for instance across the centering ring 52, as shown in Figs. 3 and 5.

To make the interior of the brake cylinder 3 and the parts contained therein and in the interior of the case 24 accessible to inspection and renovation, all that is required is to loosen the bolts 51, take off the cylinder 3 and remove the lid 59. By the elimination of the usual type of cylinder head carried by the cylinder and provided with a guide for the brake piston barrel, and by the disposition of the guide 56 for the brake piston barrel 57 within the case 24, a rather considerable simplification of the construction and a reduction of the constructional length between the brake piston 60 and the end of the reversing lever 2 acted upon by the push rod 9 are attained.

What I claim and desire to secure by Letters Patent is:

1. In a load gear equipment forming part of a vehicle brake and comprising a brake cylinder, a cylinder lever and a floating brake lever for distributing the braking force of the brake cylinder to the opposite ends of the vehicle, a reversing lever connected to said brake cylinder for transmitting the braking force from the brake cylinder to the cylinder lever, a coupling rod interconnecting said cylinder lever and floating brake lever whereby the braking force is also transmitted to the latter, a shiftable fulcrum for the reversing lever and coacting therewith, a beam comprising upper and lower longitudinal parts leaving between them a transverse space for the reversing lever and the shiftable fulcrum therefor, the beam being extended from this space towards both ends of the vehicle, a stationary fulcrum for the floating lever, mounted on one side of the beam at the extension thereof towards one end of the vehicle, the brake cylinder being disposed on the other side of the beam at the extension thereof towards the other end of the vehicle, and a case closing the transverse space for the reversing lever in the beam at the last-mentioned side thereof, a support for the brake cylinder, forming part of said case, the brake cylinder being detachably secured to this support.

2. In a load gear equipment as claimed in claim 1 the additional features that the said case has an end wall facing the brake cylinder and comprising a plate shaped as the flange of a cylinder head to which the brake cylinder, which is in the form of a cup, is clamped at its open end.

3. In a load gear equipment as claimed in claim 1 the additional features that the said case has an end wall facing the brake cylinder and comprising a plate shaped as the flange of a cylinder head and having projections by means of which it straddles the beam and is welded thereto, and that the brake cylinder is in the form of a cup and is bolted at its open end to said cylinder head.

4. In a load gear equipment as claimed in claim 1 the additional features that the said case has an end wall facing the brake cylinder and comprising a plate shaped as the flange of a cylinder head and rigidly secured to the beam in a position at right angles thereto, that the case at its end opposite said end wall is closed by, and rigidly secured to, an extension of a partition inserted between the two longitudinal upper and lower beam parts and bordering the transverse space for the reversing lever and the shiftable fulcrum therefor, and that the brake cylinder is in the form of a cup and is bolted at its open end to said cylinder head.

5. In a load gear equipment as claimed in claim 1 the additional features that the said case has an end wall facing the brake cylinder and comprising a plate shaped as the flange of a cylinder head, that the brake cylinder is in the shape of a cup bolted at its open end to said cylinder head and containing a piston having a barrel projecting into the case through said cylinder head, and that there is provided within the case a rigidly secured tubular piece for guiding said barrel, the case having a side opening and a removable lid therefor to render the interior of the case accessible to inspection.

BERT HENRY BROWALL.